(12) United States Patent
Yerli

(10) Patent No.: US 12,355,825 B2
(45) Date of Patent: Jul. 8, 2025

(54) DIGITAL AUTOMATION OF VIRTUAL EVENTS

(71) Applicant: TMRW Group IP, Luxembourg (LU)

(72) Inventor: Cevat Yerli, Dubai (AE)

(73) Assignee: TMRW Group IP, Luxembourg (LU)

(*) Notice: Subject to any disclaimer, the term of this patent is extended or adjusted under 35 U.S.C. 154(b) by 0 days.

(21) Appl. No.: 18/431,512

(22) Filed: Feb. 2, 2024

(65) Prior Publication Data
US 2024/0179191 A1 May 30, 2024

Related U.S. Application Data

(63) Continuation of application No. 17/933,435, filed on Sep. 19, 2022, now Pat. No. 11,895,164.

(51) Int. Cl.
H04L 65/1069 (2022.01)
H04L 65/1083 (2022.01)
H04L 65/60 (2022.01)

(52) U.S. Cl.
CPC ...... H04L 65/1069 (2013.01); H04L 65/1083 (2013.01); H04L 65/60 (2013.01)

(58) Field of Classification Search
CPC ............. H04L 12/1822; H04L 65/1089; H04L 65/403; H04L 65/765
See application file for complete search history.

(56) References Cited

U.S. PATENT DOCUMENTS

| 2013/0063542 A1* | 3/2013 | Bhat ................... H04L 12/1822 348/E7.083 |
| 2020/0322575 A1 | 10/2020 | Valli |
| 2020/0374324 A1 | 11/2020 | Le Strat ................... H04N 7/15 |
| 2020/0387693 A1 | 12/2020 | Donnenfeld ............. A63D 5/04 |
| 2021/0073663 A1 | 3/2021 | Keyers et al. |
| 2021/0076002 A1 | 3/2021 | Peters et al. |
| 2021/0176429 A1 | 6/2021 | Peters et al. |
| 2022/0070241 A1 | 3/2022 | Yerli |

* cited by examiner

Primary Examiner — Bryan Y Lee
(74) Attorney, Agent, or Firm — BRYAN CAVE LEIGHTON PAISNER LLP

(57) ABSTRACT

A method enabling digital automation of virtual events comprises providing a virtual environment enabling interactions between users represented by user graphical representations created from media feeds received from corresponding user cameras; responsive to a session request received from at least one client device, setting up a virtual event session between at least two users; obtaining an event flow rule set comprising a plurality of rules, the rule set determining an event flow sequence comprising presentation of media streams of the users in the virtual event session; applying the event flow rule set to the media streams of the users in the virtual event session; and, responsive to the application of the event flow rule set to the media streams, triggering an event flow action in real time in the virtual event session, wherein the triggered event flow action comprises modifying presentation of a media stream in the virtual event session.

20 Claims, 5 Drawing Sheets

DIGITAL AUTOMATION OF VIRTUAL EVENTS

CROSS-REFERENCE TO PRIOR APPLICATIONS

This application is a Continuation Application of U.S. patent application Ser. No. 17/933,435, filed on Sep. 19, 2022, the contents of which are hereby incorporated by reference herein in its entirety.

FIELD

The current disclosure relates generally to computer systems, and specifically relates to a method, system and computer-readable medium enabling the digital automation of virtual events.

BACKGROUND

Typically, real-life events, such as live performances, conferences, meetings, lectures, fashion shows, etc., are organized by designing some type of flow process that enables the event to unfold in a logical manner. However, because of lockdown situations or other types of forced mobility restrictions across the globe, other solutions have to be found that enable such events to still take place in a remote manner.

Various solutions are already available in the market to enable real-time communication and collaboration, ranging from chat applications to video telephony, such as Skype™ and Zoom™, or virtual offices for remote teams represented by 2D avatars, such as those provided by Pragli™. However, none of these solutions enable the organization of events in a logical, smooth manner, which would make the implementation of such events prone to errors and requiring a high level of human intervention and control to ensure the events run smoothly. Furthermore, the low levels of realism, lack of or limited user presence, lack of shared space and low quality or possibilities of interactions one can perform when comparing the real-life experience to these solutions contribute to a feeling of loneliness or boredom for many users, reducing user engagement levels.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect of the current disclosure, a system for providing programmable virtual events comprises a server computer system comprising at least one processor and memory storing a virtual environment and an event flow management module. The virtual environment is configured to enable interactions between users represented by user graphical representations created from media feeds received from corresponding user cameras. The event flow management module is configured to, responsive to a session request received from at least one client device, set up a virtual event session between at least two users; obtain an event flow rule set comprising a plurality of rules, the rule set determining an event flow sequence comprising presentation of media streams of the users in the virtual event session; apply the event flow rule set to the media streams of the users in the virtual event session; and, responsive to the application of the event flow rule set to the media streams of the users in the virtual event session, trigger an event flow action in real time in the virtual event session, wherein the triggered event flow action comprises modifying presentation of one or more media streams in the virtual event session.

In an embodiment, the system further comprises teleconferencing equipment comprising at least one camera and microphone per user connected to at least one client device, and to the server computer system via a network.

In some embodiments, the event flow rule set is input through computer code on any suitable programming language, or through event flow templates, or visual programming techniques.

In some embodiments, the event flow rule set comprises one or more of a participant order, a time duration per participant turn, user entitlements, and decision slots.

In some embodiments, the decision slots enable making an event decision based on one or more of voting, random selection, or contest winner selection. In further embodiments, voting data is received from an audience of the virtual event session. In further embodiments, the modifying of the presentation of the media stream comprises stopping or starting presentation of an audio stream, and the event flow rule set coordinates microphone activation and deactivation instructions and virtual camera adjustment instructions configured to adjust, based on the event flow, a virtual camera within the virtual environment. In yet further embodiments, the virtual event session is broadcast to a remote audience using the virtual camera configured within the virtual environment. In further embodiments, the voting data is further received from an audience of the virtual event.

In some embodiments, the user graphical representation comprises a user 3D virtual cutout with a removed background, or a user real-time 3D virtual cutout with a removed background, or a video with a removed background, or a video without a removed background.

In some embodiments, the virtual event session is a virtual meeting, or a virtual concert, or a virtual conference, or a fashion show or a virtual shopping session, a virtual exhibition, or a virtual performance, or a virtual lecture, and wherein the configuration of the virtual environment is associated with the virtual meeting.

In another aspect of the current disclosure, a method enabling digital automation of virtual events is provided. The method begins by providing, in memory of at least one server computer comprising at least one processor, a virtual environment enabling interactions between users represented by user graphical representations created from media feeds received from corresponding user cameras. Then the method continues by, responsive to a session request received from at least one client device, setting up a virtual event session between at least two users. The method continues by obtaining an event flow rule set comprising a plurality of rules, the rule set determining an event flow sequence comprising presentation of media streams of the users in the virtual event session. The event flow may be input, for example, by an administrator of the virtual event in the form of computer code on any suitable programming language, or through event flow templates, or visual programming techniques. The method continues by applying the event flow rule set to the media streams of the users in the virtual event session and, responsive to the application of the event flow rule set to the media streams of the users in the virtual event session, triggering an event flow action in real time in the virtual event, wherein the triggered event flow action comprises modifying presentation of a media stream in the virtual event session.

In some embodiments, the event flow rule set comprises one or more of a participant order, a time duration per participant turn, user entitlements, or decision slots. In further embodiments, the decision slots enable making an event decision based on one or more of voting, random selection, or contest winner selection. In yet further embodiments, voting data is received from an audience of the virtual event session. In some embodiments, the modifying of the presentation of the media stream comprises stopping or starting presentation of an audio stream, and the event flow rule set coordinates microphone activation and deactivation instructions and virtual camera adjustment instructions configured to adjust, based on the event flow, a virtual camera within the virtual environment. In yet further embodiments, the method further comprises broadcasting the virtual event session to a remote audience using the virtual camera configured within the virtual environment.

In some embodiments, at least one of the user graphical representations is created by a process comprising receiving, by the at least one server computer, a live data feed of a user captured by at least one camera of a sending or publishing client device; sending the captured live data feed to a subscribing or receiving client device via the at least one server computer or through a peer-to-peer (P2P) architecture; generating the at least one user graphical representation from the live data feed of the user including performing a background removal on the live data feed; and inserting, by the receiving or subscribing client device, the at least one user graphical representation into the virtual environment.

In another aspect of the current disclosure, a non-transitory computer-readable medium having stored thereon instructions configured to cause one or more server computers comprising a processor and memory to perform steps comprising providing a virtual environment enabling interactions between users represented by user graphical representations created from media feeds received from corresponding user cameras; responsive to a session request received from at least one client device, setting up a virtual event session between at least two users; obtaining an event flow rule set comprising a plurality of rules, the rule set determining an event flow sequence comprising presentation of media streams of the users in the virtual event session; applying the event flow rule set to the media streams of the users in the virtual event session; and responsive to the application of the event flow rule set to the media streams of the users in the virtual event session, triggering an event flow action in real time in the virtual event session, wherein the triggered event flow action comprises modifying presentation of a media stream in the virtual event session.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary. Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure enables providing digital automation of virtual events where users have virtual presence. Virtual presence is facilitated by technological features that allow users to feel as if they are present in a simulated location, such as in a virtual environment, while being physically not situated in that environment. In some embodiments of the current disclosure, the virtual presence is provided in a realistic manner in a way that users are represented by user graphical representations that simulate or provide an accurate image of (e.g., in the form of a video with removed background) the users in the virtual environment, including the users' appearance and expressions. This provides users the sensation of being all together in the same virtual environment.

The automation of virtual events enabling such virtual presence makes the organization of the virtual events more efficient and seamless (e.g., requiring less human intervention) than events in real life, or than other types of virtual events (e.g., videocalls). Furthermore, such an automation on events enabling virtual presence enables flexibility for the organization of a plurality of types of virtual events that are not usually considered by current teleconferencing systems, such as a virtual concert, a virtual conference, a fashion show, a virtual shopping session, a virtual exhibition, a virtual performance, a virtual lecture, and/or the like.

Figure 1:
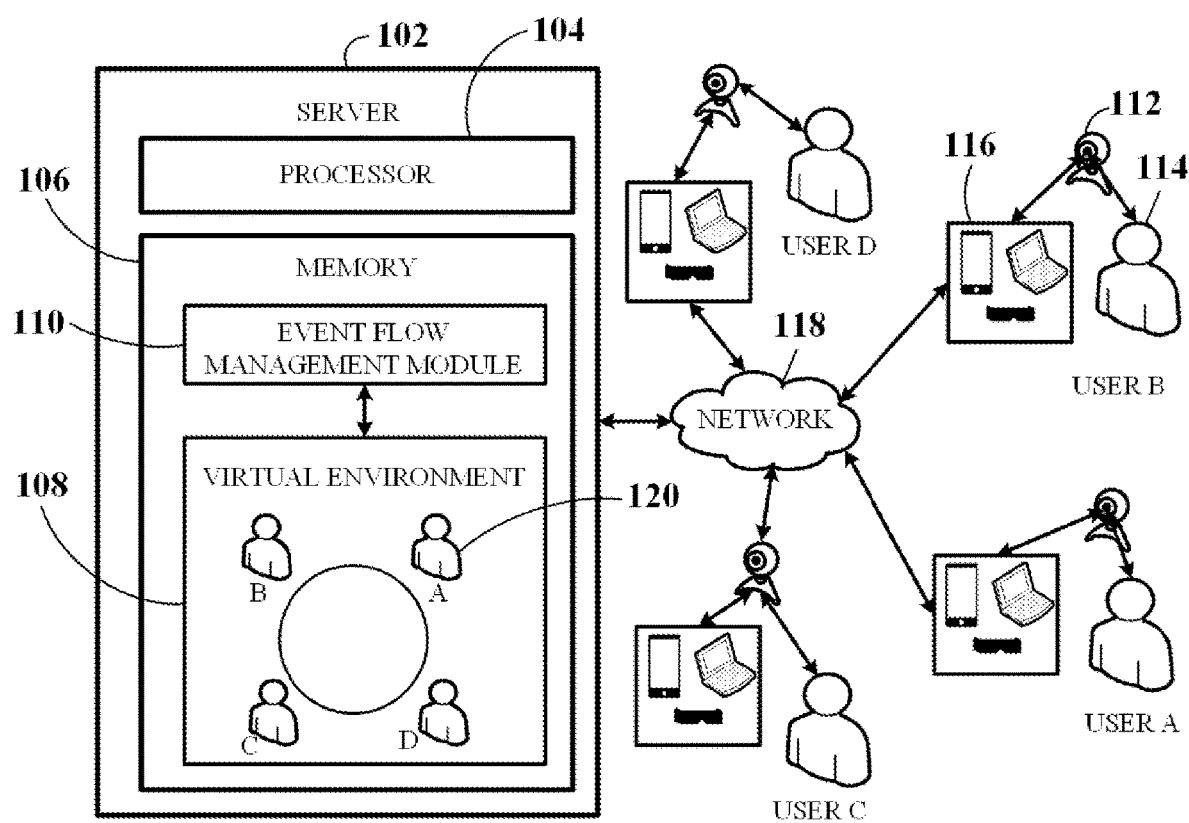
FIG. 1 depicts a system enabling a digital automation of virtual events, according to an embodiment.

FIG. 1 depicts a system enabling digital automation of virtual events, according to an embodiment.

The system comprises at least one server computer 102 of a server computer system comprising at least one processor 104 and memory 106 storing a virtual environment 108 and an event flow management module 110. The system further comprises teleconferencing equipment, such as at least one camera 112 and microphone (not shown) per user 114 connected to at least one client device 116, and to the at least one server computer 102 via a network 118.

The virtual environment 108 is configured to enable interactions between users 114 represented by a user graphical representation 120 created from a media feed received from the corresponding user camera 112. Thus, as illustrated, users A-D have their corresponding user graphical representations A-D in the virtual environment 108, enabling interactions with each other.

The event flow management module 110 is configured to, responsive to a session request received from at least one client device 116, set up a virtual event session between at least two users 114. The event flow management module 110 then obtains an event flow rule set comprising a plurality of rules, the rule set determining an event flow sequence. The event flow management module 110 applies the event flow rule set to media streams of the users in the virtual event session. Then, responsive to the application of the event flow rule set to the media streams of the users in the virtual event session, the event flow management module 110 triggers an event flow action in real time in the virtual event session. In some embodiments, the triggered event flow action comprises modifying presentation of a media stream in the virtual event session.

In an illustrative scenario, application of the event flow rule set to the media streams includes determining that a presenting user with a corresponding media stream has reached a time limit. In such a scenario, modifying presentation of the one or more media streams may include, for example, automatically stopping, visually fading out, reducing audio volume, or otherwise modifying presentation of a current media stream that has reached the time limit, and starting, visually highlighting, increasing audio volume, or otherwise modifying presentation of a media stream corresponding to the next scheduled presenter. In another illustrative scenario, application of the event flow rule set to the media streams includes determining that an audience has voted down a performance with a corresponding media stream, such as a singer in a singing competition. In such a scenario, modifying presentation of the one or more media streams may include automatically stopping, visually fading out, reducing audio volume, or otherwise modifying presentation of the voted-down performance and starting, visually highlighting, increasing audio volume, or otherwise modifying presentation of a media stream corresponding to the next scheduled performance or a performance that has been voted up by the audience.

Such a real-time operation of virtual events enables an efficient utilization of user time and decreases the chance of errors during the organization runtime of the virtual event. Additionally, the ability to program virtual events comprising virtual presence enables providing a wider range of virtual events. For example, fashion shows may comprise a real-time video stream of fashion models, where the fashion models' media streams are inserted into the virtual environment with a removed background, wherein each fashion model's graphical representation follows a path in a catwalk according to the event flow. Further in this example, the fashion models may be shown only the upper part of their body, mounted on a virtual body, or may be shown in full body if the user camera captures their bodies fully before inserting them as graphical representations in the virtual catwalk. More specifically in this example, the event flow management module 110 may apply an event flow rule set to media streams of the fashion models in the virtual catwalk. Then, responsive to the application of the event flow rule set to the media streams of the fashion models in the catwalk, the event flow management module 110 may trigger an event flow action in real time in the virtual catwalk. The triggered event flow action may comprise modifying presentation of media streams of a fashion model in the virtual catwalk, such as determining that the fashion model with a corresponding media stream has reached a time limit. Such a modification of the presentation of the media streams may include, for example, automatically stopping, visually fading out, reducing audio volume, or otherwise modifying presentation of the current media stream of the fashion model that has reached the time limit, and starting, visually highlighting, increasing audio volume, or otherwise modifying presentation of a media stream corresponding to a next fashion model in the virtual catwalk. In another example, a movie award show, may have a plurality of speeches, awards and movie scenes broadcasting that are programmed according to a timeline that is input as part of the event flow rules, where the flow management module 110 may apply an event flow rule set to media streams of the actors, speakers, movie scenes, etc., related to the virtual movie award show and accordingly trigger an event flow action comprising modifying presentation of the corresponding media streams.

Modules of the system of FIG. 1, comprising, e.g., the virtual environment 108 and the event flow management module 110 refer to software modules comprising discrete pieces of computer code which may be independently created and maintained to be used for the purposes described herein. The modules can be distributed for and used by the system to use the functionality of the different modules. The software modules may be connected to corresponding hardware modules, which may be a selection of independent electronic circuits configured to provide the functions of the corresponding software modules. Through virtualization and distributed computing techniques, the modules of the current disclosure may be distributed across a plurality of computing devices, such as a plurality of server computers connected to each other through the network 118.

The virtual environment 108 is hosted as part of a videoconferencing platform enabling video communications between users. The virtual environment 108 may enable sharing in real-time a plurality of experiences, such as live performances, concerts, webinars, keynotes, fashion shows, virtual shopping sessions, virtual exhibitions, virtual lectures and the like, to a plurality (e.g., thousands or even millions) of user graphical representations 120. These virtual performances may be presented by and/or multi-casted to a plurality of instances of a virtual environment 108 to accommodate a large number of users from various parts of the world. The videoconferencing platform may enable a plurality of social interactions such as chatting, screen sharing, sending or receiving multimedia files, hand-raising, preparation of meeting summaries, moving objects, playing games, performing transactions, engaging in private or group conversations, and the like. Such a videoconferencing platform may use any suitable system architecture to enable communications in virtual environments. However, as the current disclosure teaches ways to automate events using the videoconferencing platform, such social interaction features may be enabled depending on a set of rules stored in the event flow management module 110. For example, the event flow rules may determine that a question and answer (Q&A) session is enabled after speaker A finishes presenting. In response to speaker A finishing the presentation, the microphone of a user that has raised his or her hand may be activated by the event flow management module 110 to enable the interested user to ask a question. In another example, the flow rules may determine that users may chat amongst each other during presentation, or may determine that the chat must be disabled, as decided by the event administrator.

The virtual environment 108 may refer to a virtual scene, world or universe where users can explore, subscribe to and interact with published media content items therein, communicate with each other, and the like. In an example, various virtual environments 108 may be combined to form a virtual world. For instance, a plurality of virtual environments 108 of stores may be combined in a single virtual shopping mall, where users can explore via their user graphical representation, view different media, and interact with each other. The virtual environment 108 comprises assets that may be modeled through a plurality of software platforms or software engines. The assets may be defined in a scene description, which may be in the form of a scene graph comprising properties and values and which may be based on computer models. The computer models are descriptions of a three-dimensional object defined by data comprising geometry, textures, physics, lighting, materials, etc.

A virtual environment 108 thus refers to a virtual construct (e.g., a virtual model) that may be designed through any suitable 3D modelling technique through computer assisted drawing (CAD) methods. In some embodiments, the virtual environment 108 refers to a virtual construct that is scanned from a real construct (e.g., a physical room) through any suitable scanning tools, comprising image-scanning pipelines input through a variety of photo, video, depth measurements, and/or simultaneous location and mapping (SLAM) scanning in order to generate the virtual environment 108. For example, radar-imaging, such as synthetic-aperture radars, real-aperture radars, Light Detection and Ranging (LIDAR), inverse aperture radars, monopulse radars, and other types of imaging techniques may be used to map and model real-world constructs and turn them into a virtual environment 110. In other embodiments, the virtual environment 108 is a virtual construct that is modelled after a real construct (e.g., a room, building or facility in the real world).

The assets included in the virtual environment 108 may comprise any of 2D or 3D image data, 3D geometries, video data, audio data, textual data, haptic data, time data, 3D entities, 3D dynamic objects, priority data, security data, positional data, lighting data, depth data, infrared data, and corresponding metadata, amongst others.

In some embodiments, the client devices 116 may be one or more of mobile devices, personal computers, laptops, game consoles, media centers, smart contact lenses, and head-mounted displays, amongst others. The cameras 112 may be one or more of a 2D or 3D camera, 360-degree camera, web-camera, RGBD camera, CCTV camera, professional camera, mobile phone camera, depth camera (e.g., LIDAR), or a light-field camera, amongst others.

In some embodiments, the user graphical representation comprises a user 3D virtual cutout with a removed background, or a user real-time 3D virtual cutout with a removed background, or a video with a removed background, or a video without a removed background.

In the current disclosure, a user 3D virtual cutout may include a virtual replica of a user constructed from a user-uploaded or third party-source 2D photo. In an embodiment, the user 3D virtual cutout is created via a 3D virtual reconstruction process through machine vision techniques using the user-uploaded or third party-source 2D photo as input data, generating a 3D mesh or 3D point cloud of the user with removed background. In one embodiment, the user 3D virtual cutout may have static facial expressions. In another embodiment, the user 3D virtual cutout may comprise facial expressions updated through the camera feed. In yet another embodiment, the user 3D virtual cutout may comprise expressions that may be changed through buttons on the user graphical interface, such as buttons that permit the user 3D virtual cutout to smile, frown, be serious, and the like. In yet a further embodiment, the user 3D virtual cutout uses combinations of aforementioned techniques to display facial expressions. After generating the user 3D virtual cutout, the status and/or facial expressions of the user 3D virtual cutout may be continuously updated by, e.g., processing the camera feed from the user.

A user real-time 3D virtual cutout may include a virtual replica of a user based on the real-time 2D or 3D live video stream data feed obtained from the camera and after having the user background removed. In an embodiment, the user real-time 3D virtual cutout is created via a 3D virtual reconstruction process through machine vision techniques using the user live data feed as input data by generating a 3D mesh or 3D point cloud of the user with removed background. For example, the user real-time 3D virtual cutout may be generated from 2D video from a camera (e.g., a webcam) that may be processed to create a holographic 3D mesh or 3D point cloud. In another example, the user real-time 3D virtual cutout may be generated from 3D video from depth cameras (e.g., LIDARs or any depth camera) that may be processed to create a holographic 3D mesh or 3D point cloud. Thus, the user real-time 3D virtual cutout represents the user graphically in three dimensions and in real time.

A video with removed background may include a video streamed to a client device, wherein a background removal process has been performed so that only the user may be visible and then displayed utilizing a polygonal structure on the receiving client device. Video without removed background may include a video streamed to a client device, wherein the video is faithfully representing the camera capture, so that the user and his or her background are visible and then displayed utilizing a polygonal structure on the receiving client device. The polygonal structure can be a quad structure or more complex 3D structures used as a virtual frame to support the video.

In some embodiments, the user graphical representation 120 is created by a process comprising receiving, by the at least one server computer 102, a live data feed captured by at least one camera 112 of a sending client device; sending the captured data to the receiving client device via the server 102 or through a P2P architecture; performing a background removal of the user 114 of the sending client device in order to extract only the image representing the user sending user; and inserting, by the receiving client device, the user graphical representation 120 into the virtual environment 112.

In some embodiments, the data used as input data comprised in the live data feed and/or user-uploaded or third-party-source 2D photo comprises 2D or 3D image data, 3D geometries, video data, audio data, textual data, haptic data, time data, 3D entities, 3D dynamic objects, metadata, priority data, security data, positional data, lighting data, depth data, and infrared data, amongst others.

In some embodiments, the virtual environment 108 utilizes a hybrid system architecture, which includes a client-server side and a peer-to-peer (P2P) side. In an embodiment the client-server side comprises web or application servers. The client-server side may be further configured to include secure communication protocols; micro-services; a database management system; a database; and/or a distributed message and resource distribution platform. Server-side components may be provided along with the client devices that communicate to the servers through a network. The client-server side defines the interaction between the one or more clients and the server through the network, including any processing performed by a client side, a server side, or a receiving client side. In an embodiment, one or more of the corresponding clients and servers perform the necessary image and media processing according to various rule-based task allocation combinations. In an embodiment, the web or application servers are configured to receive client requests employing the secure communication protocols and process the client requests by requesting the micro-services or data corresponding to the requests from the database using a database management system. The micro-services are distributed utilizing a distributed message and resource distribution platform using the publish-subscribe model.

The P2P side comprises a P2P communication protocol enabling real-time communication between client devices in the virtual environment; and a rendering engine configured to enable the client device to perform real-time 3D rendering of live session elements therein included (e.g., user graphical representations) in the virtual environment. An example of a suitable P2P communication protocol may be a Web Real-Time Communication (WebRTC) communication protocol, which is collection of standards, protocols, and JavaScript APIs, which, in combination, enable P2P audio, video, and data sharing between peer client devices. An example of a suitable rendering engine may be 3D engines based on WebGL, which is a JavaScript API for rendering 2D and 3D graphics within any compatible web browser without the use of plug-ins, allowing accelerated usage of physics and image processing and effects by one or more processors of the client device (e.g., one or more graphic processing units (GPUs)). In an embodiment, the P2P side further includes a computer vision library configured to enable the client device to perform real-time computer vision tasks in the virtual environment. An example of a suitable computer vision library may be OpenCV, which is a library of programming functions configured mainly for real-time computer vision tasks. Using such a hybrid model of communication may enable rapid P2P communications between users reducing latency problems while providing web services and resources to each session, enabling a plurality of interactions between users and with content in the virtual environment.

In some embodiments, the client devices 116 and at least one cloud server computer 102 connect through a wired or wireless network 118. In some embodiments, the network may include millimeter-wave (mmW) or combinations of mmW and sub 6 GHz communication systems, such as 5th generation wireless systems communication (5G). In other embodiments, the system may connect through wireless local area networking (Wi-Fi). In other embodiments, the system may communicatively connect through 4th generation wireless systems communication (4G), may be supported by 4G communication systems, or may include other wired or wireless communication systems.

In some embodiments, the at least one server computer 102 is a media server computer using a Multipoint Control Unit (MCU) topology, or a selective forwarding unit (SFU) topology, or a Traversal Using Relay NAT (TURN) topology, or a spatially analyzed media server topology (SAMS).

In some embodiments, the at least one server computer 102 may be an intermediary server, meaning that the server is used to facilitate and/or optimize the exchange of data between client devices. In such embodiments, the at least one cloud server may manage, analyze process and optimize incoming image and multimedia streams and manage, assess, optimize the forwarding of the outbound streams as a router topology (for example but not limited to SFU, SAMS, multimedia server routers, or an image and media processing (for example but not limited to decoding, combining, improving, mixing, enhancing, augmenting, computing, manipulating, encoding) and forwarding server topology (for example but not limited to MCU, cloud media mixers, cloud 3D renderer, and the like), or other server topologies.

In embodiments where the intermediary server is a SAMS, such media server manages and processes incoming data of each publishing client device (e.g., including but not limited to metadata, priority data, data classes, spatial structure data, three dimensional positional, orientation or locomotion information, image data, scalable video codec based video). In an embodiment, the SAMS optimizes the forwarding of the outbound data streams to each client device by modifying, upscaling or downscaling the media for temporal (varying frame rate), spatial (e.g., different image size), level of detail, quality (e.g., different compression or encoding based qualities) and color (e.g., color resolution and range) based on the specific receiving client device user's spatial, three dimensional orientation, distance and priority relationship to such incoming data, which may be useful for achieving optimal bandwidths and computing resource utilizations for one or more user client devices.

Figure 2:
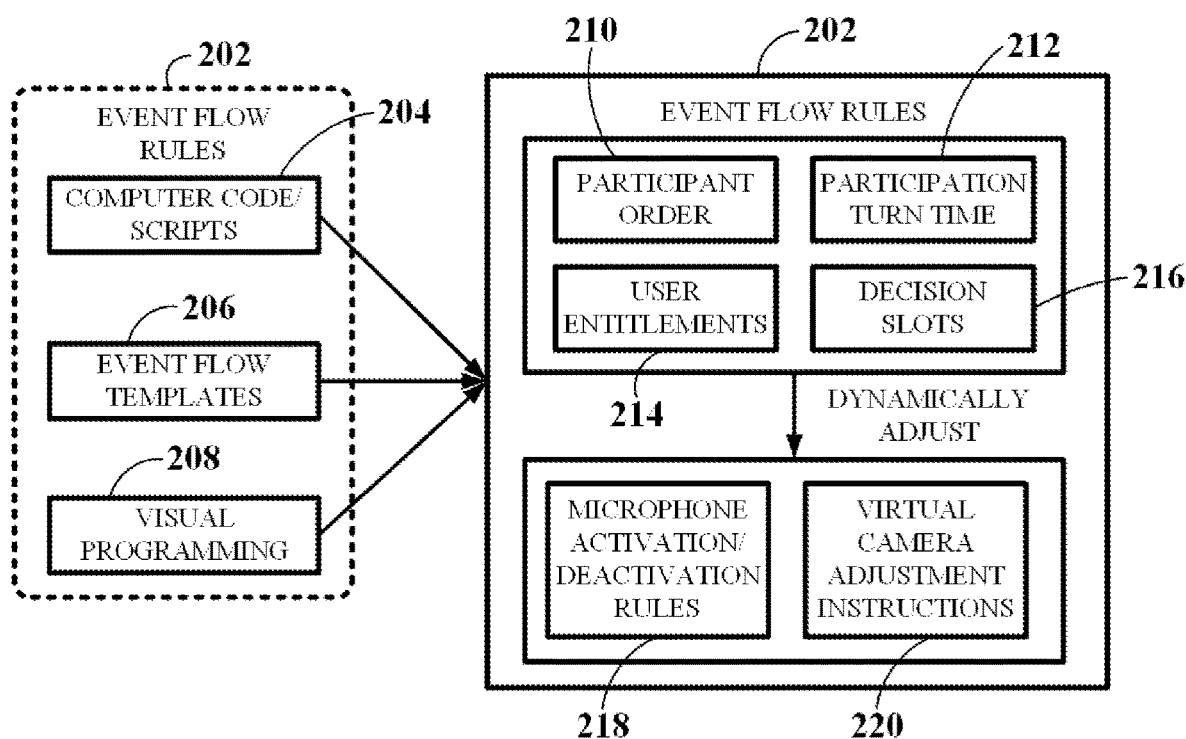
FIG. 2 depicts example meeting flow rules used in the system enabling a digital automation of virtual events, according to an embodiment.

FIG. 2 depicts example event flow rules 202 used in the system enabling a digital automation of virtual events, according to an embodiment.

Event flow rules 202 may be input through computer code or scripts 204 on any suitable programming language, or through event flow templates 206 that may be filled out by an event administrator, or through visual programming techniques 208. The computer code or scripts may be directly input by the event administrator through suitable programming languages, such as C, C++, COBOL, JAVA™, PHP, Perl, Python, Ruby, HTML, CSS, Javascript, VBScript, ASPX, Microsoft .NET™ languages such as C #, and/or the like. Computing logic may be compiled into executable programs or written in interpreted programming languages. The event flow templates 206 may be a user-friendly scripted template that enables an event administrator to fill in event flow data that is later translated into computer code that manages the meeting flow in real time. The visual programming techniques 208 may refer to computer languages that enable users to create programs by manipulating program elements graphically rather than by specifying them textually. In some embodiments, the event flow templates are created through a visual programming technique 208.

In some embodiments, event flow rules 202 comprise one or more of a participant order 210, a time duration per participant turn 212, user entitlements 214, or decision slots 216.

The participant order 210 refers to which turn the participant takes in the event flow. Such an order may be determined by orientation on a virtual table (e.g., clockwise or anticlockwise), direction (e.g., left or right on a virtual scenario with a plurality of speakers), by participant priority, randomly, by votes, and/or the like. The time duration per participant turn 212 may be based on the length of a presentation or performance to be provided by the participant, or may be set homogeneously across all participants based on the total session time length, or may be set according to user priority, and/or the like. The user entitlements 214 refer to user permissions that may be based on user priority. The priority, or priority score, refers to a fixed or variable score that is assigned to each user that is used in the calculation of the participant order 210 and that reflects the relative importance of that user in that specific point in time of the event flow. For example, when the priority is variable, the priority may vary according to the moment of the event flow, such as when the user is being a speaker, or asking a question as part of an audience, or when the user is next in the event flow, etc. However, the priority may also be set as a fixed score assigned for the whole session independent of the moment within the event flow, such as for an event administrator or a VIP, which provides them more user entitlements 214 than other participants. In one example, the user entitlement 214 enables a participant with a certain priority score, e.g., an event administrator, to override the current event rules. In this example, after a modification of the event rules, the event flow management module may readjust the event flow. For example, the event administrator may, based on a lack of participation at the beginning of a session, add more wait time before beginning the event. In another example, the event administrator may delay the end of the event by adding more time because of a high user engagement. In another example, the event administrator may reduce or increase break time.

The decision slots 216 refer to turning points during the event flow in which the event may go in different directions. In some embodiments, the decision slots 216 enable making an event decision based on one or more of a voting, random selection, or contest winner selection. In yet a further embodiment, voting data is further received from an audience of the virtual event via corresponding client devices of the audience. For example, if the event flow reaches a point in which one of a plurality of videos is to be shown to an audience of the virtual event based on a vote during the execution of a decision slot 216, then the audience may be allowed to send voting data through the network using their corresponding client devices. The results of the voting may trigger an event flow action in real time that may set the direction of the event flow. Thus, the decision slots may allow the event flow to be adjusted dynamically in an interactive manner that involves participants. In one example, a random selection may randomly select one of the participants of which the selected participant may continue speaking or performing as part of the event flow. In one example, a contest winner may be allowed by the event flow management module triggering a game (e.g., a virtual basketball shootout round, a virtual ping pong match, a karaoke contest, a cards match, etc.) of which the winner may continue speaking or performing as part of the event flow. In one example, the contest may use a roulette, tombola or lottery ticket selection mode to determine the direction of the event flow.

In a further embodiment, the event flow rules coordinate microphone activation and deactivation instructions 218 and virtual camera adjustment instructions 220 based on the event flow. Such instructions may, based on the specific point during the event flow, enable the event flow management module to coordinate the activation and deactivation of microphones based on the current point during the event flow. For example, if a participant is currently speaking, his or her microphone may be automatically activated, while the microphones of all other users may be deactivated. Then, when the event flow moves to take the turn for another participant, the microphone of the first participant may be deactivated and the microphone of the second participant may be activated.

The virtual camera adjustment instructions 220 may enable the event flow management module to adjust the angle, zoom, sharpness, resolution, etc., of a virtual camera within the virtual room. This adjustment may enable, for example, focusing the angle and zoom of the virtual camera on the current speaker for broadcasting to an audience. Thus, each of the participants of the event may view the event in a first-person view that is adjusted to the position and orientation of their user graphical representation, but a broadcasting camera may be used to capture and broadcast the scene within the virtual environment by dynamically being adjusted based on the event flow for said broadcast to an audience. The broadcast may also be shared within the virtual environment in, e.g., a shared projecting area of the virtual environment, such as a virtual projecting wall, virtual whiteboard, virtual tablet, and the like.

Figure 3A:
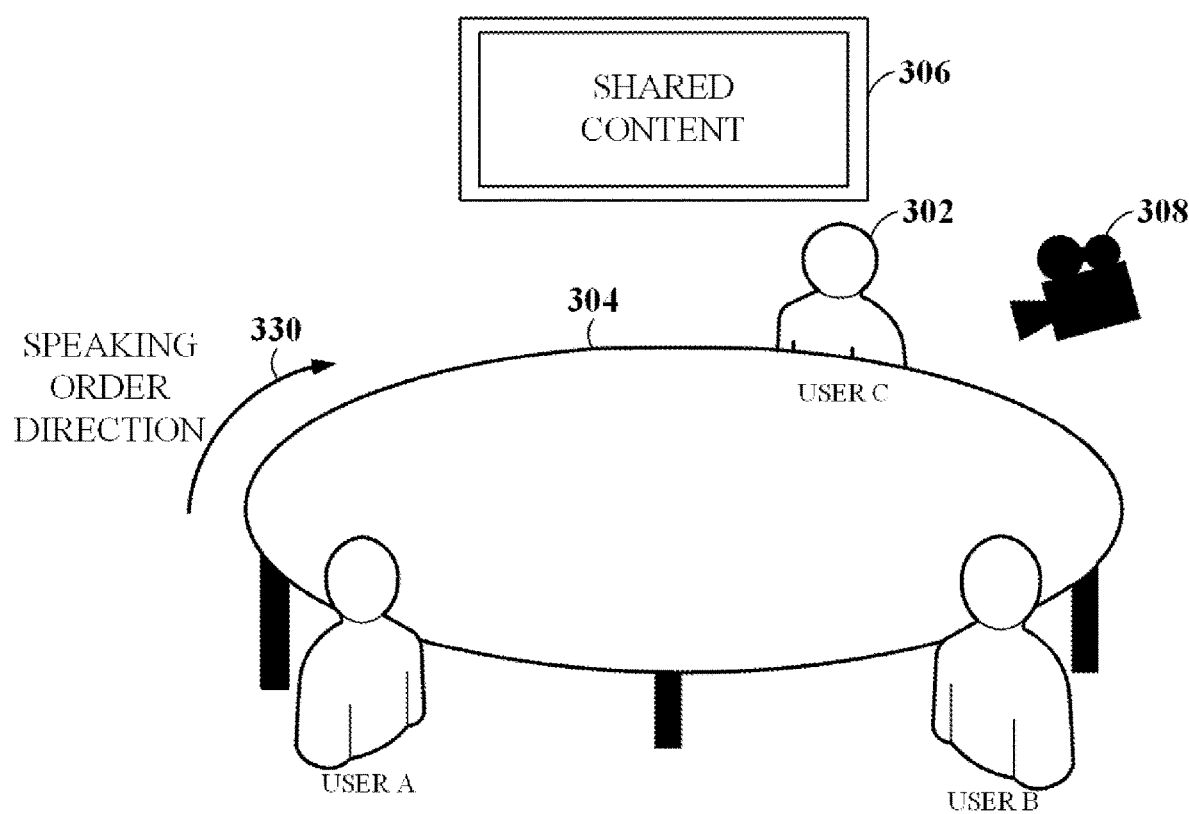
FIG. 3A depicts an example of a virtual event, according to an embodiment.

FIG. 3A depicts an example of a virtual event, according to an embodiment. The virtual event comprises three users 302, users A-C sitting around a virtual meeting table 304. The virtual event further comprises a shared content screen 306 and a virtual camera 308.

Figure 3B:
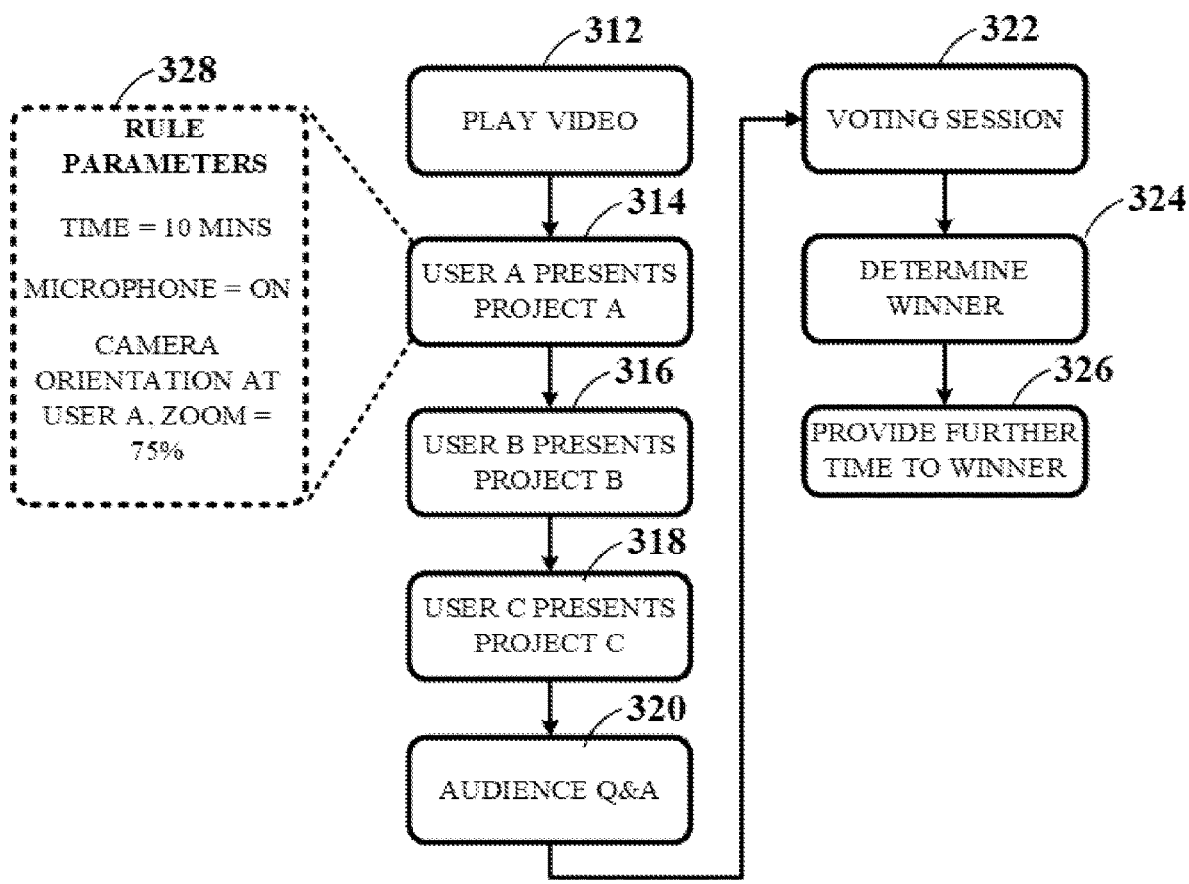
FIG. 3B depicts an example of an event flow used to manage the virtual event, according to an embodiment.

FIG. 3B depicts an example of an event flow 310 used to manage the virtual event of FIG. 3A, according to an embodiment.

According to the illustrative event flow 310, the virtual event may begin in step 312 by playing a video on the shared content screen 306. The video may be selected beforehand by the event administrator and may be stored in the memory of the at least one server computer or may be retrieved from a third-party source and streamed on the shared content screen 306. After the video is over, the event flow management module may continue in step 314 by user A presenting project A; then in step 316 by user B presenting project B; then in step 318 by user C presenting project C. Thus, the event flow order may follow a clockwise speaking order direction 330, as seen in FIG. 3A. Although not depicted, if it is so determined prior to the virtual event, during their respective turns, each of the participants may share their screens on, e.g., shared content screen 306, or may have their contents be shared automatically by the event flow management system if the content was provided beforehand.

In step 320, the virtual event may continue by enabling a Q&A session, which may be followed by step 322 by enabling a voting session. Both the Q&A session and voting session may enable receiving corresponding input from a remote audience remotely watching the virtual event through a corresponding client device. Then, in step 324, the event flow management module may check the results of the voting session to determine a winner. In the example event flow 310, user C was selected as a winner, so the event flow continues in step 326 by providing further time to the winner: user C.

Further in FIG. 3B, example rule parameters 328 are shown for step 314, i.e., when the user A presents project A. The sample rule parameters 328 are indicated as a time of 10 minutes, having an activated microphone, and a virtual camera 308 orientation directed to the user A with a zoom of 75%. Although only the rule parameters 328 for step 314 are presented, those skilled in the art may appreciate that such rule parameters 328 may be adjusted per step of the event flow, e.g., by changing presentation time, microphone settings, virtual camera orientation, zoom level, or the like.

Figure 4:
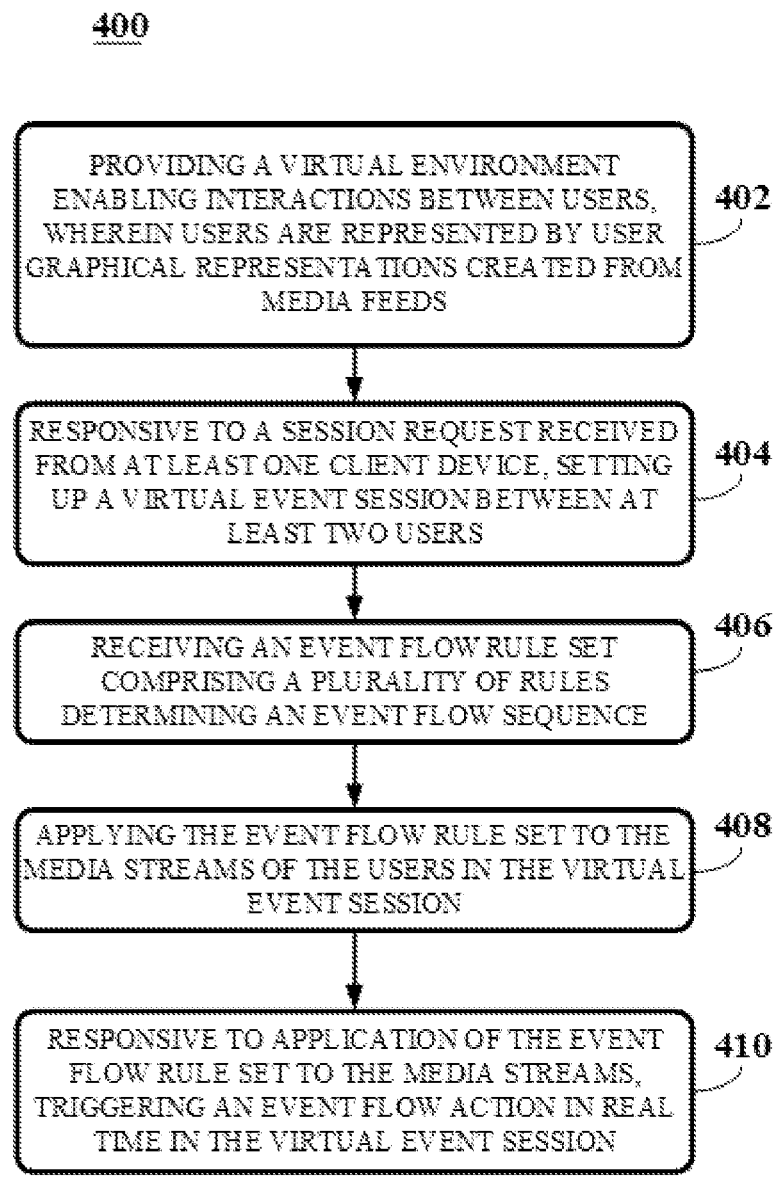
FIG. 4 depicts a method enabling a digital automation of virtual events, according to an embodiment.

FIG. 4 depicts a method 400 enabling a digital automation of virtual events, according to an embodiment.

The method 400 begins in step 402 by providing, in memory of at least one server computer comprising at least one processor, a virtual environment enabling interactions between users, wherein each of the users are represented by a user graphical representation created from a media feed received from a corresponding user camera. Then, in step 404, the method continues by, responsive to a session request received from at least one client device, setting up a virtual event session between at least two users. In step 406, the method continues by obtaining an event flow rule set comprising a plurality of rules, the rule set determining an event flow sequence. The event flow sequence comprises presentation of media streams of the users in the virtual event session. The event flow rule set may be obtained from memory of the at least one server computer or in some other way. In some embodiments, the event flow rule set is obtained based on input received by the at least one server computer. Such input may be provided, for example, by an administrator of the virtual event in the form of computer code in any suitable programming language, or through event flow templates, or visual programming techniques. In step 408, the method continues by applying the event flow rule set to the media streams of the users in the virtual event session. Finally, in step 410, responsive to the application of the event flow rule set to the media streams of the users in the virtual event session, the method 400 ends by triggering an event flow action in real time in the virtual event session. The triggered event flow action comprises modifying presentation of a media stream in the virtual event session.

In some embodiments, the event flow rules comprise one or more of a participant order, a time duration per participant turn, user entitlements, and decision slots. In further embodiments, the decision slots enable making an event decision based on one or more of a voting, random selection, or contest winner selection. In yet further embodiments, the voting data is received from an audience of the virtual event. In some embodiments, the event flow rules coordinate microphone activation and deactivation instructions and virtual camera adjustment instructions configured to adjust, based on the event flow, a virtual camera within the virtual environment. In yet further embodiments, comprising broadcasting the virtual event to a remote audience using the virtual camera configured within the virtual environment.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A method for providing virtual events, comprising:
    providing, in memory of at least one server computer comprising at least one processor, a virtual environment comprising user graphical representations;
    responsive to a session request received from at least one client device, setting up a virtual event session between at least two users;
    obtaining a rule set, the rule set determining an event flow sequence comprising presentation of a media stream in the virtual event session;
    and
    triggering an event flow action in the virtual event session based on the rule set,
    wherein the triggered event flow action comprises modifying the presentation of the media stream in the virtual event session, and
    wherein the user graphical representations comprise a user 3D virtual cutout with a removed background, or a user real-time 3D virtual cutout with a removed background, or a video with a removed background, or a video without a removed background.

2. The method of claim 1, further comprising applying the rule set to the media stream in the virtual event session.

3. The method of claim 1, wherein the rule set is input through one or more event flow templates.

4. The method of claim 1, wherein the rule set comprises one or more of a participant order, a time duration per participant turn, user entitlements, or decision slots.

5. The method of claim 4, wherein the decision slots enable making an event decision based on one or more of voting, random selection, or contest winner selection.

6. The method of claim 5, wherein voting data is received from an audience of the virtual event session.

7. The method of claim 1, wherein the modifying of the presentation of the media stream comprises stopping or starting presentation of an audio stream, and wherein the rule set coordinates microphone activation and deactivation instructions and virtual camera adjustment instructions configured to adjust, based on the event flow sequence, a virtual camera within the virtual environment.

8. The method of claim 7, further comprising broadcasting the virtual event session to a remote audience using the virtual camera configured within the virtual environment.

9. The method of claim 1, wherein at least one of the user graphical representations is created by a process comprising:
    receiving, by the at least one server computer, a live data feed of a user captured by at least one camera of a publishing client device;
    sending the captured live data feed to a subscribing client device;
    generating the at least one user graphical representation from the live data feed of the user including performing a background removal on the live data feed; and
    inserting, by the subscribing client device, the at least one user graphical representation into the virtual environment.

10. A system for providing virtual events, comprising:
    a server computer system comprising at least one processor and memory storing a virtual environment and an event flow management module;
    wherein the virtual environment comprises user graphical representations; and
    wherein the event flow management module is configured to:
        responsive to a session request received from at least one client device, set up a virtual event session between at least two users;
        obtain a rule set, the rule set determining an event flow sequence comprising presentation of a media stream in the virtual event session;
        and
        trigger an event flow action in the virtual event session based on the rule set,
    wherein the triggered event flow action comprises modifying the presentation of the media stream in the virtual event session, and
    wherein the user graphical representations comprise a user 3D virtual cutout with a removed background, or a user real-time 3D virtual cutout with a removed background, or a video with a removed background, or a video without a removed background.

11. The system of claim 10, wherein the rule set is input through event flow templates.

12. The system of claim 10, wherein the rule set comprises one or more of a participant order, a time duration per participant turn, user entitlements, or decision slots.

13. The system of claim 12, wherein the decision slots enable making an event decision based on one or more of voting, random selection, or contest winner selection.

14. The system of claim 13, wherein voting data is received from an audience of the virtual event session.

15. The system of claim 10, wherein the modifying of the presentation of the media stream comprises stopping or starting presentation of an audio stream, and wherein the rule set coordinates microphone activation and deactivation instructions and virtual camera adjustment instructions configured to adjust, based on the event flow sequence, a virtual camera within the virtual environment.

16. The system of claim 15, wherein the virtual event session is broadcast to a remote audience using the virtual camera configured within the virtual environment.

17. The system of claim 10, wherein the event flow management module is configured to apply the rule set to the media stream in the virtual event session.

18. The system of claim 10, wherein the virtual event session is a virtual meeting, or a virtual concert, or a virtual conference, or a fashion show or a virtual shopping session, a virtual exhibition, or a virtual performance, or a virtual lecture, and wherein the configuration of the virtual environment is associated with the virtual meeting.

19. A non-transitory computer-readable medium having stored thereon instructions configured to cause one or more server computers comprising a processor and memory to perform steps comprising:
   providing a virtual environment comprising user graphical representations;
   responsive to a session request received from at least one client device, setting up a virtual event session between at least two users;
   obtaining a rule set, the rule set determining an event flow sequence comprising presentation of a media stream in the virtual event session;
   and
   triggering an event flow action in real time in the virtual event session,
   wherein the triggered event flow action comprises modifying the presentation of the media stream in the virtual event session, and
   wherein the user graphical representations comprise a user 3D virtual cutout with a removed background, or a user real-time 3D virtual cutout with a removed background, or a video with a removed background, or a video without a removed background.

20. The non-transitory computer-readable medium of claim 19, wherein the modifying of the presentation of the media stream comprises stopping or starting presentation of an audio stream, and
   wherein the rule set coordinates microphone activation and deactivation instructions and virtual camera adjustment instructions configured to adjust, based on the event flow sequence, a virtual camera within the virtual environment.

* * * * *